United States Patent [19]

Park

[11] Patent Number: 4,856,946

[45] Date of Patent: Aug. 15, 1989

[54] THREADING ASSEMBLY

[76] Inventor: Hong K. Park, 203 Southcrest, Huntsville, Ala. 35802

[21] Appl. No.: 633,707

[22] Filed: Jul. 23, 1984

[51] Int. Cl.⁴ ............................................. B23B 45/12
[52] U.S. Cl. .................................. 408/122; 10/129 M; 408/123
[58] Field of Search ............ 408/120, 121, 122, 122.5, 408/123; 10/129 R, 129 M

[56] References Cited

U.S. PATENT DOCUMENTS

| 300,604 | 6/1884 | Hartmann | 408/120 |
| 1,065,163 | 6/1913 | Miller | 408/121 |
| 1,265,630 | 5/1918 | Donohue | 408/121 |
| 2,985,899 | 5/1961 | Elliot | 408/222 |
| 3,364,510 | 1/1968 | Johnson | 408/123 |
| 4,087,195 | 5/1978 | Wood | 408/240 |
| 4,149,820 | 4/1979 | Newlin | 408/120 |

Primary Examiner—Joseph H. McGlynn
Assistant Examiner—Daniel W. Howell
Attorney, Agent, or Firm—C. A. Phillips

[57] ABSTRACT

A threading assembly including biasing means for biasing a threading tap or die in a selected direction and a reversible ratchet assembly for applying a torque about an axis coinciding with the axis of the tap or die. An alignment guide concentrically aligns both the axis of the torque and the downward bias, and a threading chuck is secured to the ratchet assembly for clamping the threading tap or die therein. The longitudinal axis of the threading tap or the central axis of the threading die coincides with the axis of the forces applied to its.

1 Claim, 3 Drawing Sheets

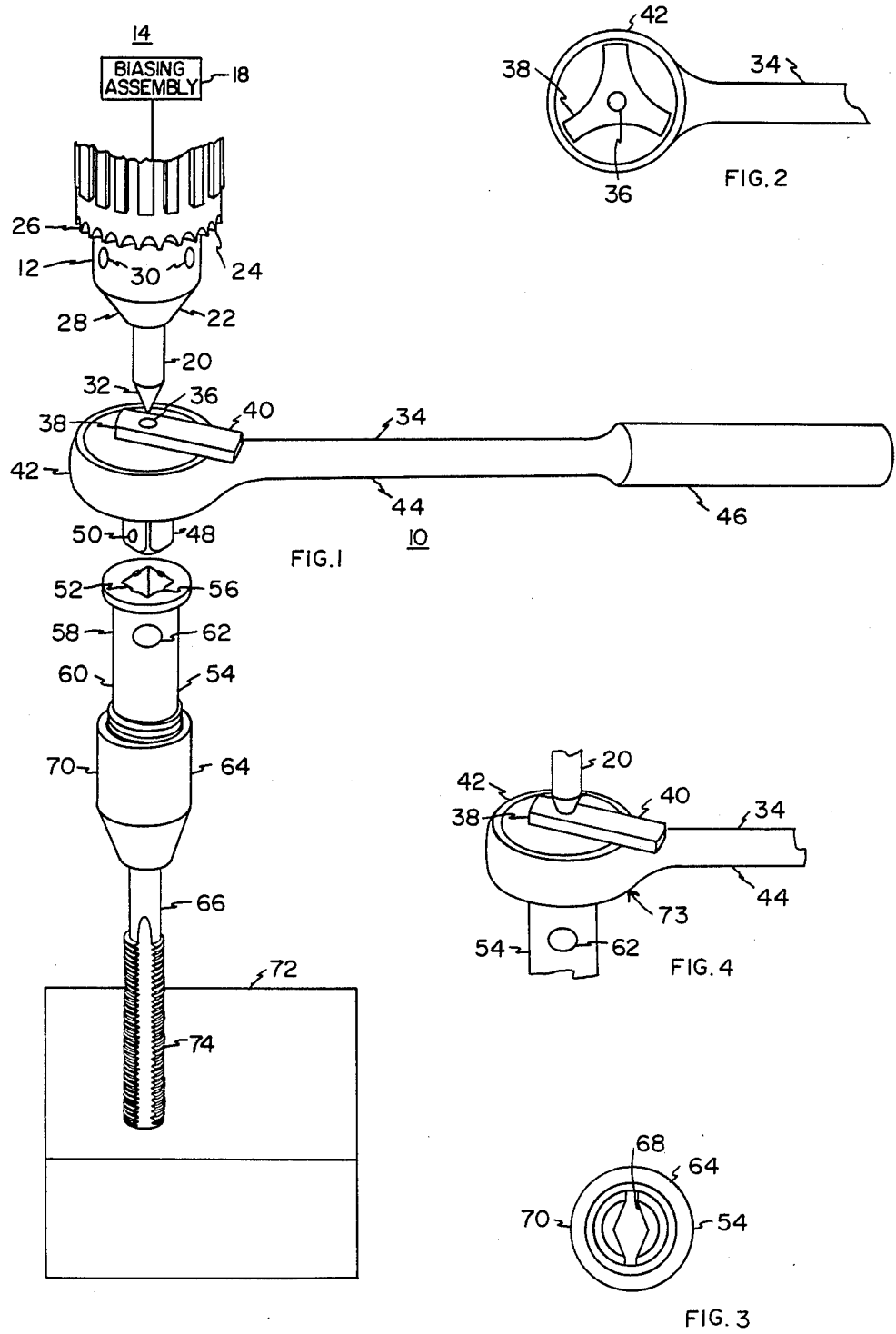

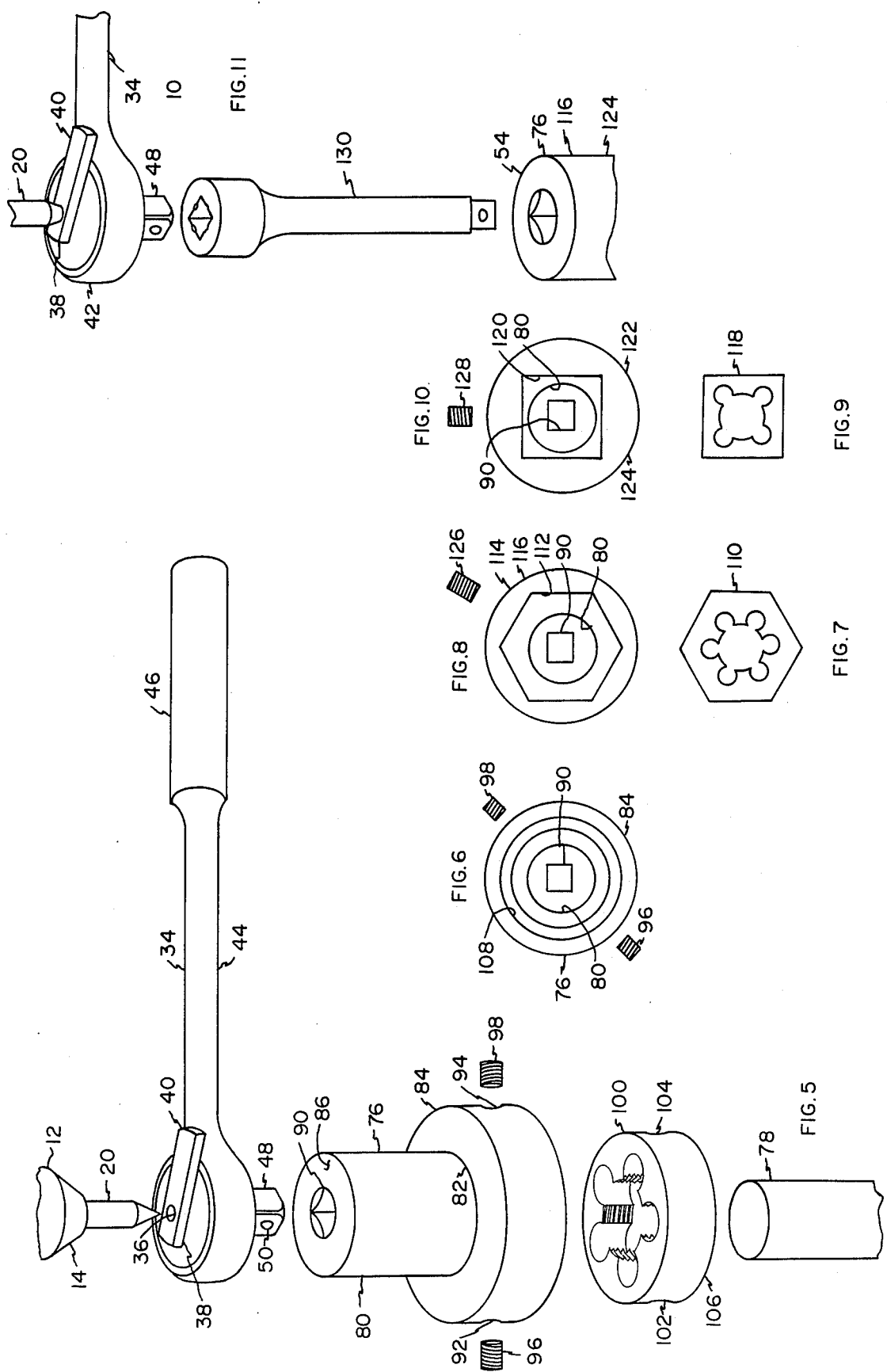

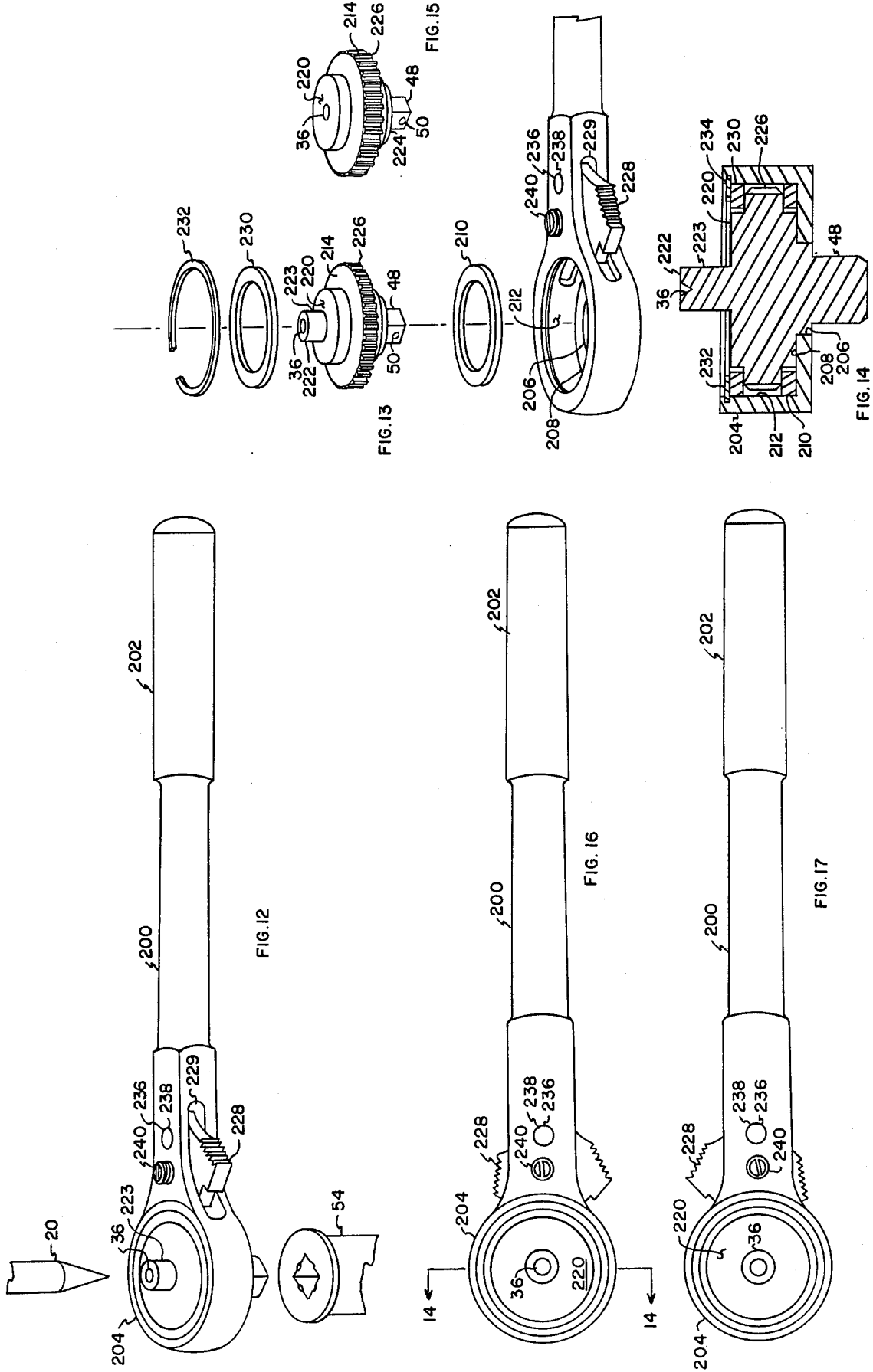

THREADING ASSEMBLY

TECHNICAL FIELD

This invention pertains to a system for threading a workpiece, and more particularly to a system for co-axially aligning threading torque with axial bias.

BACKGROUND ART

There exists in the prior art numerous systems for threading a shaft or holes in a workpiece. These systems may roughly be divided into three groups: a power group where the threading torque is applied under machine power; a T-handle group where the threading torque is applied manually on opposite sides of the threader (tap or die) such as with a T-shaped handle or bar; and a wrench group where the threading torque is applied manually on a single side of the threader such as with a Crescent TM wrench.

The power group requires the most costly tools of these three groups since there is needed a powered drill press that not only applies a downward force but also a rotational force to the threading tap or die. The disadvantages of this group become immediately apparent when attempting to thread hard material because when doing so, threading taps or dies are very easily broken or their threads are damaged. They break because to thread material properly, the constant application of threading torque is inappropriate. Instead, the threading torque should only be applied periodically, alternating with a reverse torque to clear any filings out of the threads. When periodically applying power torque, such constant reversal of the threading torque is time consuming and significantly increases the wear and tear on the drill chuck or holder. Furthermore, by being powered, a machinist is without any "feel" as to how much torque should be applied before reversing it. Additionally, when threading blind holes (holes which do not extend through a workpiece but instead have a bottom to them), this lack of "feel" often causes an operator to bottom out the threading tap against the bottom of the hole, which either will strip any threads previously grooved or will break the tap because the tap is still rotating but no longer moving axially. This type of failure is also applicable to power threading with a die when threading a stud extending from a workpiece. If the die should be rotated to thread the entire length of the stud and bottom out against the workpiece while still being rotated, the die or die teeth will either break or the threads previously grooved will be stripped. This, again, is due to an operator's lack of "feel" during the power threading process.

The T-handle group provides the "feel" lacking in the powered group, but one of its major disadvantages is its inability to be utilized under tight or close working conditions, such as in a corner. The outward extension of the T-handle requires considerable clearance around the area to be threaded. If a shorter T-bar is used to reduce the clearance required, then the machinist must apply more force to rotate the tap or die which becomes very tiring and inefficient should a large number of holes or shafts need to be threaded. Further, since the torque is manually applied, it is very easy for this torque to be applied at a skew angle and not aligned with the hole or shaft to be threaded. Additionally, the machinist must apply both a reversible rotational torque and a periodic downward force to the threader which increases the risk of grooving threads at a skew angle. Furthermore, both hands are necessary to rotate the T-handle group of threaders, thus preventing the machinist from guiding or providing some other needed operation simultaneous with the rotation of the threader.

The Crescent TM wrench group enables the threading of a hole or shaft in tight or closely confined quarters unlike the T-handle group but since the torque applied in the crescent wrench group is from one side only, there is a great probability that the hole or shaft threaded will be at a skew angle and not properly aligned as desired. Also, the wrench which is used is oftentimes unable to firmly and securely grip small threading taps without rounding the corners of the tap or otherwise being unable to grip a small area and rotate these taps. Further, by applying rotational force to only one side of the threader, a longer lever arm is required to generate the same torque with the same amount of applied force as is obtained by the T-handle group. This increases the chance of threading at a skew angle, and this longer arm reduces the ability of an operator to "feel" the threading of the hole or shaft. The longer lever arm and the lack of "feel" associated with this group increases the risk of "push-over," which is the application of too much sideways force and not enough downward force to the tap, which results in skew holes being drilled. Sufficient "feel" is necessary if the threader is to remain unbroken because otherwise too much rotational force may be applied without properly clearing filings from threads, thereby causing the tap or die to break. Furthermore, even with the single handle associated with this group, the operator's free hand is required for the application of a reverse torque and for stabilizing the threader in addition to properly aligning the threader with respect to the hole or shaft being threaded.

It is an object of this invention to enable the continuous alignment of the threading tap or die with an aligned workpiece and to do so such that the risk of threading at a skew angle is essentially eliminated. Another object is to enable one-handed application of the torque in addition to one-handed reversal of the applied torque, thus leaving the other hand available for other operations. A further feature is to enable holes or shafts to be threaded in tight or close quarters without the need for wide clearances on all its sides. Additionally, since an operator need only be directly concerned with the application of the rotational force, a "feel" for the material and its threading is enhanced.

SUMMARY OF THE INVENTION

In accordance with this invention, an elongated threading chuck is configured having a notched key way at one end for clamping a threading member therein. The threading member is configured having a central axis, and it is rotated about this axis by a ratchet assembly. This ratchet assembly includes a keyed shaft which is inserted within the key way in the threading chuck, and it includes a centering guide co-axial with the central axis. A press member applies an axially aligned force through the centering guide of the ratchet assembly.

BRIEF DESCRIPTION OF THE DRAWINGS

FIG. 1 is an exploded pictorial view, partially broken away, of a tap threading assembly.

FIG. 2 is a planar view, partially broken away, of an alternate embodiment of the ratchet head.

FIG. 3 is a planar view of the clamping system of the tap holding chuck.

FIG. 4 is a pictorial view of the tap threading assembly, partially broken away, as it would appear during operation.

FIG. 5 is an exploded pictorial view, partially broken away, of a die threading assembly.

FIG. 6 is a planar view showing the round interior surface configuration of the round die holding chuck.

FIG. 7 is a planar view of a hexagonal die.

FIG. 8 is a planar view showing the hexagonal interior surface configuration of the hexagonal die holding chuck.

FIG. 9 is a planar view of a square die.

FIG. 10 is a planar view showing the square interior surface configuration of the square die holding chuck.

FIG. 11 is a pictorial view, partially broken away, of an alternate embodiment of the threading assembly illustrating the use of an extension.

FIG. 12 is pictorial view, partially broken away, of an alternate embodiment of the ratchet.

FIG. 13 is an exploded pictorial view, partially broken away, of the ratchet referred to in FIG. 12.

FIG. 14 is a sectional view taken along line 14—14 of FIG. 16.

FIG. 15 is a pictorial view of an alternate embodiment of the socket main body.

FIG. 16 is a planar view of the ratchet with the selector knob positioned in one position.

FIG. 17 is a planar view of the ratchet with the selector knob positioned in an opposite position.

DETAILED DESCRIPTION OF THE DRAWINGS

Referring initially to FIG. 1, there is shown threading assembly 10 which includes drill chuck 12 being a part of drill press 14 which conventionally includes a vertical force biasing assembly 18 by which chuck 12 is moved along its axis. This chuck 12 may exert a downward bias transferable through alignment guide 20. Alignment guide 20 is clamped within end 22 of drill chuck 12 by variable clamp 24 that is adjusted by rotating gear 26 around center support 28 by means of a conventional chuck key (not shown) inserted in holes 30. End region 32 of alignment guide 20 is configured having a conical taper although other configurations are possible. Thus, as drill chuck 12 is moved vertically, guide 20 is also moved vertically and the downward force exerted by biasing assembly 18 is transmitted downward through alignment guide 20.

This downward force is transferred to ratchet 34 by the engagement of alignment guide 20 within centering hole 36. Centering hole 36 is adapted to accept end region 32 of guide 20 and hole 36 as shown is positioned within selector knob 38 of ratchet 34. Extension 40 of knob 38 extends beyond ratchet head 42, and extension 40 enhances the positioning of knob 38. As seen in FIG. 2, selector knob 38 may be triangular in shape or this knob may have some other shape; however, despite the configuration of this knob, ratchet head 42 includes a centering hole 36 configured to receive alignment guide 20.

Integral with ratchet head 42 is elongated handle 44 having its outer region 46 knurled for better grip. A keyed shaft 48 containing a detent ball 50 secured to ratchet head 42 is aligned with centering hole 36 and alignment guide 20. Keyed shaft 48 is conventionally sized and fits into opening 52 in tap holding chuck 54. Along the perimeter of opening 52 are four recessed areas 56 which assist in the insertion of detent ball 50 into opening 52. Below opening 52 in end 58 of tap holding chuck 54 is a short shaft 60 having a passageway 62 laterally therethrough. This passageway 62 is for the insertion of a T-bar (not shown) through tap holding chuck 54. Shaft 60 transfers the downward force applied to tap holding chuck 54 from ratchet 34 to clamp 64. Clamp 64 is threadably adjustable and accepts a variety of differently sized threading taps 66. Clamp 64 contains jaws 68 (FIG. 3) which, by rotating clamping nut 70, move either toward or away from each other. It is this movement which enables clamp 64 to engage tap 66 and once engaged, the downward force of drill chuck 12 is transferred through tap 66 and onto workpiece 72 that is to be tapped.

Referring now also to FIG. 4, there is shown tap threading assembly 73 as it would appear in actual operation with the downward force from drill press 14 being transferred through alignment guide 20, ratchet 34, tap holding chuck 54, tap 66 and onto workpiece 72. Knob 38 of ratchet 34 would be rotated to a selected position, and handle 44 would be rotated to turn tap holding chuck 54 and tap 66 either clockwise or counterclockwise during the tapping process. Knob extension 40 would enable knob 38 to be alternately positioned single handedly without releasing contact with handle 44. Thus, with this assembly, an operator would be able to rotate tap 66 a short distance, then flip knob 38 to its other position, rotate tap 66 again a short distance in an opposite direction to clean away filings from its threads 74, and then flip knob 38 once more to start the cycle over again all with one hand without releasing contact with handle 44. During this process, alignment guide 20 ensures that tap 66 remains properly aligned and does not become skewed. Additionally, a downward force is constantly being applied to tap 66 by drill press 14 to enable tap 66 to be drilled into workpiece 72. Generally, this downward force is applied by an operator having one hand on a lever (not shown) being a part of biasing assembly 18 such that any movement of this lever results in a corresponding downward movement of chuck 12. Thus, an operator is able to rotate tap 66 with one hand while causing chuck 12 to exert a downward force through tap 66 with the other hand.

Referring now to FIG. 5, there is shown an alternate embodiment of threading assembly 10. In this embodiment, a die holding chuck 76 is secured to ratchet 34 such that exterior threads may be applied to workpiece 78. Die holding chuck 76 is configured having an upper hollow cylinder 80 secured at its bottom edge 82 to a lower hollow cylinder 84. Upper surface 86 of upper cylinder 80 has an opening 90 therein configured similar to opening 52 in tap holding chuck 54. Opening 90 is sized to accept keyed shaft 48 and detent ball 50. Lower cylinder 84 is configured having oppositely spaced openings 92 and 94 in its outer wall sized to accept set screws 96 and 98, respectively. These set screws 96 and 98 thread into openings 92 and 94, respectively, and engage die 100 interior of lower cylinder 84. Set screws 96 and 98 are secured within openings 102 and 104 in die 100 to prevent any rotational slippage between die 100 and die holding chuck 76. Thus when die holding chuck 76 is rotated by ratchet 34, die 100 is also rotated. Die 100 is then positioned around workpiece 78 such that when ratchet 34 is rotated and drill chuck 12 applies a downward force, die 100 threads workpiece 78.

Die 100 has a circular outer perimeter 106 and, as such, the inner perimeter 108 of lower cylinder 84 is also circular to accept die 100 (FIG. 6). Accordingly for hexagonal die 110 (FIG. 7), the inner perimeter 112 of lower cylinder 114 of die holding chuck 116 is hexagonal (FIG. 8) to accommodate it and similarly for square die 118 (FIG. 9), the inner perimeter 120 of lower cylinder 122 of die holding chuck 124 is square (FIG. 10). Additionally, as illustrated in FIG. 8, there is a single set screw 126 which threads into chuck 116 and engages die 110. Similarly, as shown in FIG. 10, set screw 128 threads into chuck 124 and engages die 118. These set screws 126 and 128 secure dies 110 and 118 within chucks 116 and 124, respectively, when chucks 116 and 124 are lifted and moved about. The operation of die holding chucks 76, 116, and 124 are similar to tap holding chuck 54 in that they are rotated and biased downward about a similar axis.

As an additional feature of threading assembly 10, an extension 130 (FIG. 11) may be used between ratchet 34 and any of chucks 76, 116, 124, or 54 to enable threading of a workpiece from a distance above the workpiece. Extension 130 is conventional in construction, installation, and operation.

Referring now to FIGS. 12–17, there is shown an alternate embodiment of a ratchet positionable between alignment guide 20 and a threading chuck, such as chuck 54. Ratchet 200 is configured having a knurled handle 202 at one longitudinal end and an enlarged ratchet head 204 at its other longitudinal end. Ratchet head 204 includes a circular opening 206 therethrough and annular shoulder 208. Lower guide ring 210 is pressed into cavity 212 in ratchet head 204 and is positioned against shoulder 208 as shown in FIG. 14. Socket main body 214 is positioned within cavity 212 against lower guide ring 210 with keyed shaft 48 extending through opening 206 and beyond ratchet head 204. Socket main body 214 incorporates centering hole 36 in end region 220 and, as shown in FIGS. 13 and 15, respectively, centering hole 36 may be located in end 222 of stud 223, or centering hole 36 may be flush with end region 220.

Opposite end region 224 of socket main body 214 incorporates keyed shaft 48, coaxial with centering hole 36, and detent ball 50. Intermediately between keyed shaft 48 and centering hole 36 are gear teeth 226 which mesh with selector key knob 228 pivotally supported within opening 229 in ratchet 200. Upper guide ring 230 is pressed against socket main body 214 within cavity 212, and retaining ring 232 fits within groove 234 in cavity 212 to retain socket main body 214 in place. Socket main body 214 is supported between upper and lower guide rings 230 and 210, enabling it to rotate about an axis passing through the center of both centering hole 36 and keyed shaft 48 but restricting its axial movement along this axis.

When utilizing ratchet 200, an operator would flip selector key knob 228 to a first position, such as that shown in FIG. 16, and rotate ratchet 200, thereby rotating a chuck in one direction. Afterwards, key knob 228 is flipped to a second position such as that shown in FIG. 17, thereby enabling a chuck to be rotated in an opposite direction. Key knob 228 is pivoted about pivot pin 236 in opening 229 in ratchet head 204. Pivot pin 236 is pressed into opening 238 in ratchet 200, and adjacent retaining screw 240 retains key knob 228 in place once selected.

What is claimed is:

1. A system for threading a workpiece comprising:
   an elongated, generally cylindrical, threading tool chuck having a central axis, one longitudinal end of said chuck having a square receptacle and the other end having clamping means for clamping a threading tool about said central axis, and including a threaded rotatable adjustment member for adjustably clamping a threading tool about a central axis, said threading chuck including a passageway transverse to said central axis for the insertion of a turning tool;
   drive means comprising:
   a ratchet assembly operable about said central axis and including a direction selection arm on one side of said ratchet assembly and positioned to intercept said central axis for effecting selected direction of rotation of drive of said ratchet assembly,
   a conical notch formed in and about said central axis in said selector arm;
   a square shaft on an opposite side, with respect to said one side of said ratchet assembly and insertable into said square receptacle of said chuck, and
   handle means coupled to said central ratchet assembly for rotating said central ratchet assembly about said central axis; and
   biasing means comprising a conical tip adapted to fit within said conical notch for applying a biasing force to said conical notch and thereby along said axis to a threading tool, bias being applicable simultaneously with the rotation of said drive means.

* * * * *